United States Patent [19]

Cohen et al.

[11] Patent Number: 5,069,985
[45] Date of Patent: Dec. 3, 1991

[54] PLAQUE FUEL CELL STACK

[75] Inventors: Ronald Cohen, West Hartford; Eugene W. Hall, Gastonbury, both of Conn.

[73] Assignee: International Fuel Cells Corporation, South Windsor, Conn.

[21] Appl. No.: 480,243

[22] Filed: Feb. 15, 1990

[51] Int. Cl.[5] .............................................. H01M 8/02
[52] U.S. Cl. ...................................... 429/26; 429/38; 429/39
[58] Field of Search ..................... 429/26, 38, 39, 34, 429/35, 36, 37

[56] References Cited

U.S. PATENT DOCUMENTS

| | | | |
|---|---|---|---|
| 409,365 | 8/1889 | Mond et al. | 429/38 |
| 3,554,803 | 8/1967 | Poirier | 429/39 |
| 3,716,414 | 2/1973 | Goldberger | 429/39 |
| 4,623,596 | 11/1986 | Kamoshita | 429/26 |
| 4,699,853 | 10/1987 | Okada et al. | 429/39 |

*Primary Examiner*—Donald L. Walton
*Attorney, Agent, or Firm*—William J. Sapone

[57] ABSTRACT

A stacked fuel cell has a plurality of cell plaques, each plaque having a plurality of horizontally disposed fuel cells placed in an insulating frame. By utilizing a plurality of cell plaques, overall fuel cell stack voltage can be substantially increased by interconnecting adjacent plaque cells to form substacks which are in turn connected in series. Thus stack voltage is increased without requiring additional fuel cell height.

8 Claims, 3 Drawing Sheets

PLAQUE FUEL CELL STACK

TECHNICAL FIELD

This invention relates to fuel cells, and more particularly to stacked fuel cells.

BACKGROUND OF THE INVENTION

To increase fuel cell power output, individual fuel cells are typically assembled in a stack, one above another, with each fuel cell in the stack having an associated system for supplying fuel and oxidizing gases to the cell, for recovering spent gases and for drawing off electrical power. Generally, the number of fuel cells disposed in the stack determines the stack voltage; i.e., a high stack achieves a high total stack voltage. Of course, there are physical and practical constraints on the height of a fuel cell stack. For example, in aircraft applications, a fuel cell stack must be compact to optimize use of the limited fuselage space with increased voltages achieved by using additional fuel cell stacks. Of course, this increases the complexity of the piping and electrical systems, increasing space requirements. Consequently, a compact fuel cell stack which provides high voltage continues to be pursued in the industry.

SUMMARY OF THE INVENTION

According to the present invention, a fuel cell stack comprises a plurality of cell plaques, disposed in a stack each cell plaque having multiple fuel cells. The individual plaque cells are electrically isolated from each other within the plaque but electrically connected to adjoining cells in adjacent plaques to form a plurality of substacks. The fuel cells are fluidically interconnected for common supply and return of fuel, oxidizing gases and spent gases. By stacking a number of plaques one upon another, a plurality of high voltage substacks are formed within the stack which, when interconnected, minimize stack height while maximizing stack voltage, without increasing the supply system complexity.

DETAILED DESCRIPTION OF THE INVENTION

Figure 1:
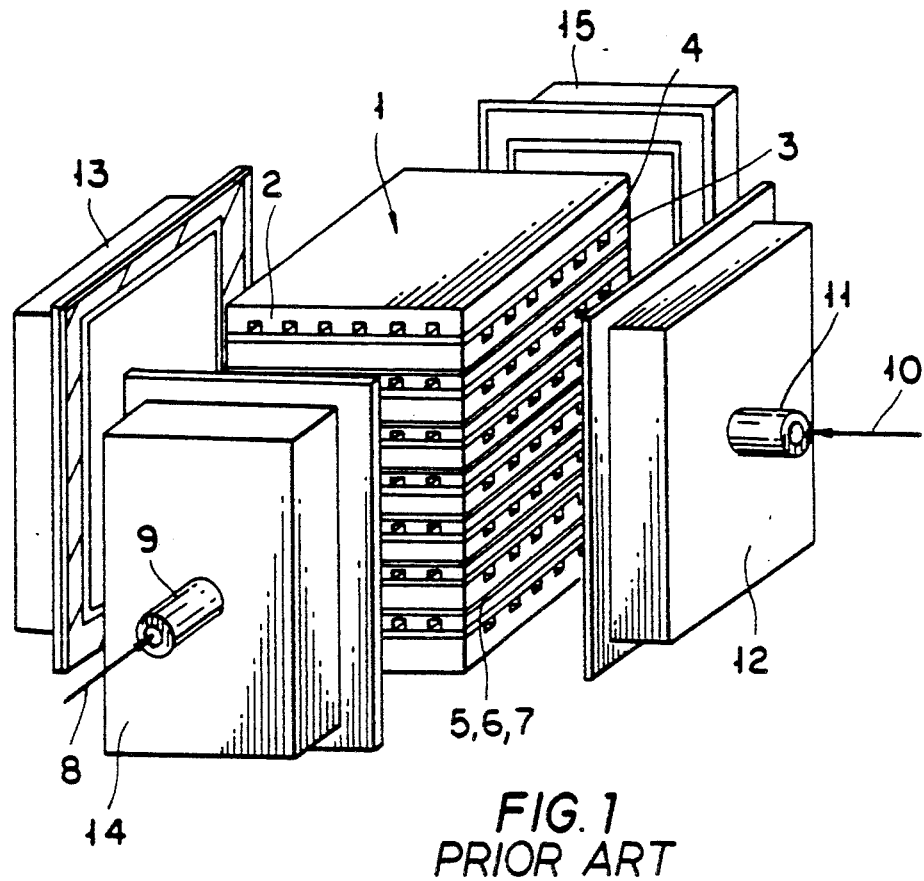
FIG. 1 is a prior art fuel cell stack.

Referring to FIG. 1, a prior art fuel cell stack 1 is shown, the stack utilizing a ribbed electrode-type unit fuel cell. A pair of gas permeable carbon plates 2 and 3 are provided, each of whose two main surfaces have a series of longitudinal ribs between which are grooves 4 which are gas permeable. The ribs on one surface extend perpendicular to the ribs on the other surface. Sandwiched between the plates are a fuel catalyst layer 5, a matrix 6 and an oxidizer catalyst layer 7. A fuel gas, indicated by arrow 8 as entering through a manifold port 9, flows along the grooves in the ribbed plate 2 with the fuel gas permeating into the fuel catalyst layer. An oxidizing gas indicated by arrow 10 as entering through a manifold port 11, flows along the grooves into the ribbed plate 3, permeating into the oxidizer catalyst layer 7. In this form, the plates 2 and 3 serve as separators between cells, as unit cells are stacked, with the gas flowing through the grooves in the upper plate used in the cell located above the cell shown while the gas flowing through the grooves of the bottom plate used in the unit cell located below the cell shown.

The cells are typically electrically connected in series so that the number of unit cells determines the stack voltage. Terminal connections (not shown) are located at the end plates of the stack for power withdrawal. The cell stack 1 includes an oxidizer supply manifold 12, an oxidizer return manifold 13, a fuel supply manifold 14 and a fuel return manifold 15, each manifold provided with associated supply and return piping.

Figure 2:
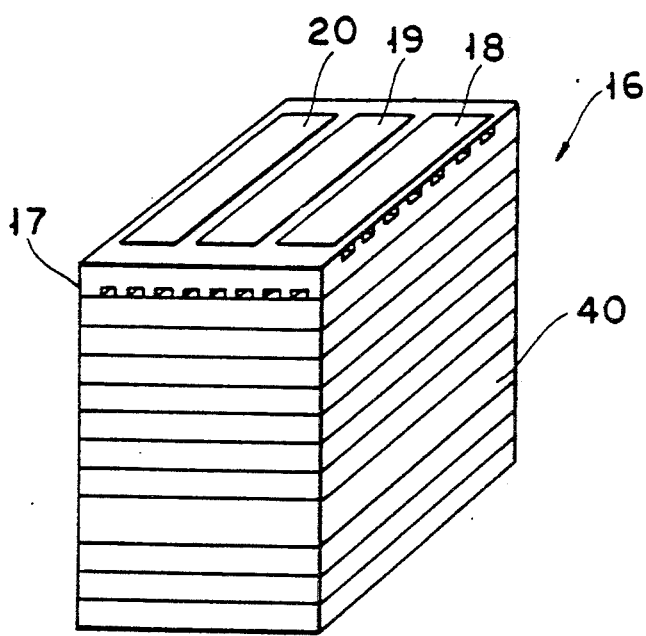
FIG. 2 is a perspective view of a fuel cell stack including a plurality of cell plaques disposed therein.

Referring to FIG. 2, a stack-type fuel cell 16 is shown, including a plurality of cell plaques 17, stacked one upon another. The fuel cell stack uses conventional fuel supply and return manifolds, oxidizer supply and return manifolds, and means for external electrical interconnections. These have not been shown, for ease in illustration, since they are of conventional construction.

Figure 3:
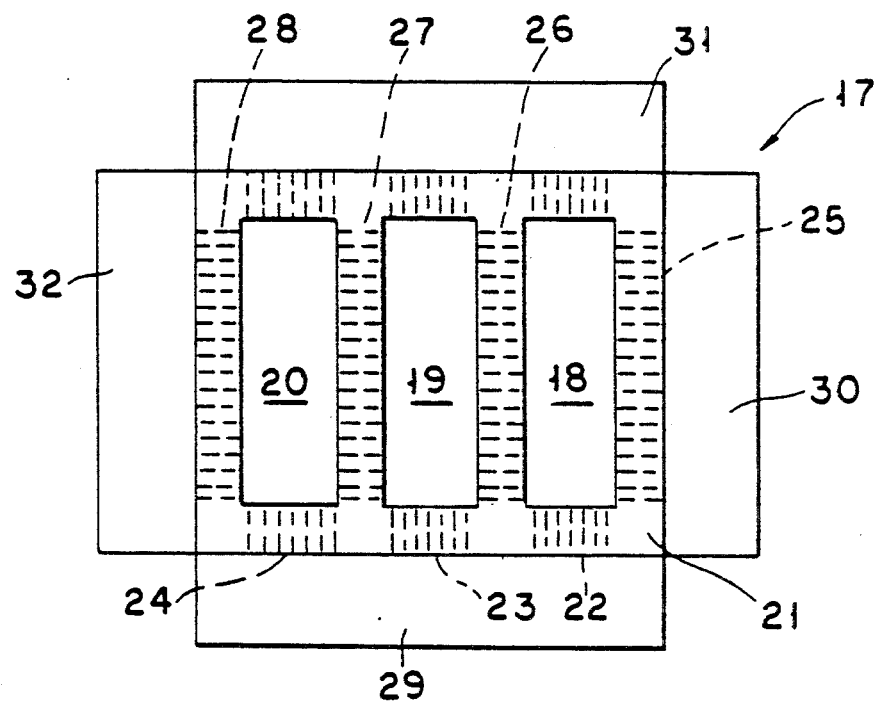
FIG. 3 is a top view of the cell plaque of the present invention.

Referring to FIG. 3, a plan view of the cell plaque 17 is shown. The term "plaque" is defined as a flat stackable unit containing multiple separated fuel cells in a horizontal plane. The plaque 17 has three fuel cells 18, 19 and 20 disposed in an insulating frame 21. Each plaque cell has associated supply and return fuel and oxidizing ports extending through the insulating frame. The plaque 17 includes fuel supply conduits 22, 23 and 24 which supply the fuel in a parallel flow to the cells 18, 19 and 20, respectively. The oxidizer is supplied serially, through ports 25, cell 18, ports 26, cell 19, ports 27, cell 20, and exiting through ports 28. Of course, the oxidizer and fuel flows may be reversed. These ports connect the cells to the respective fuel and oxidizer supply and return manifolds 29, 30, 31 and 32, respectively. Thus, fluidically, the cells are connected in parallel for one reactant and in series for the other reactant.

Each cell is electrically insulated from the next cell in a plaque by the frame except where interconnections are used for electrically connecting the cells at the ends of the stack. While three fuel cells per plaque are shown, it should be understood by those skilled in the art that any number of cells could be used per plaque, limited only by physical constraints and design considerations in terms of voltage and power output for the overall fuel cell stack. As the cell plaques are stacked, on top of each other, a substack is formed. Where three plaque cells are used, the stack consists of 3 substacks, defined as the vertically adjacent cells in the plaques. The voltage of each substack is the voltage per cell times the number of plaques, with the voltage per stack being the voltage per substack times the number of cells per plaque.

Figure 4:
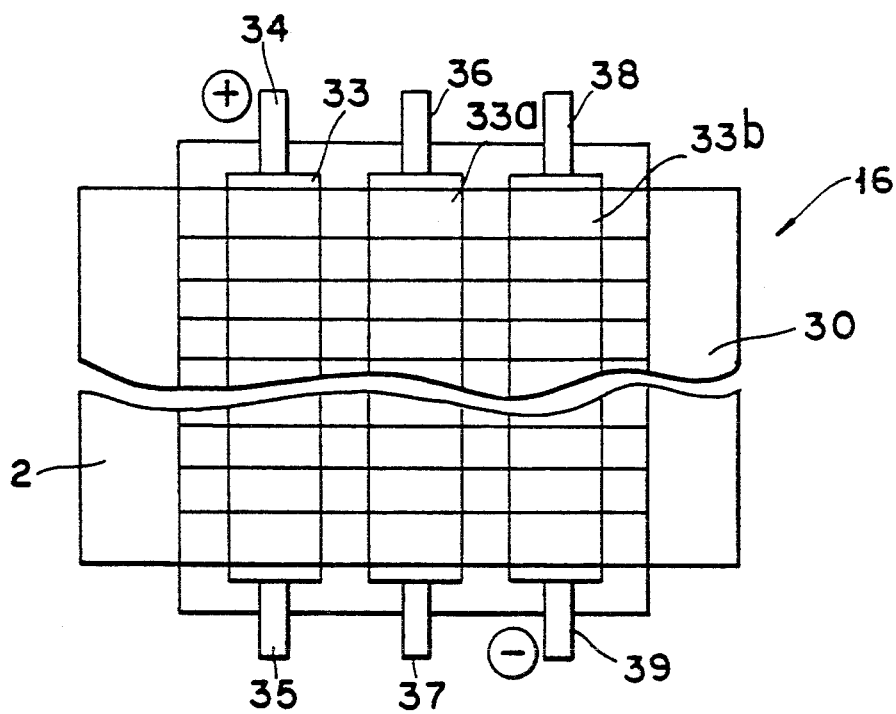
FIG. 4 is an illustrative view showing the external electrical interconnection of the substacks formed by stacking cell plaques.

Referring to FIG. 4, a side cross-sectional view of the stack 16 is shown, illustrating the electrical interconnections for the cell substacks. Three individual substacks 33, 33a and 33b are connected in series in order to maximize voltage output from the stack. The substack 33 has a positive power lug 34 and a negative power lug 35. To obtain high voltage, the lug 35 is connected to the adjoining substack 33a at a positive lug 36. The substack 33a has a negative lug 37 which is connected to a positive lug 38 on the substack 33b. Power is withdrawn through the lug 34 and a negative lug 39. The number of plaques per stack may be customized to suit a particular installation and/or to achieve a desired voltage and power output per stack.

Figure 5:
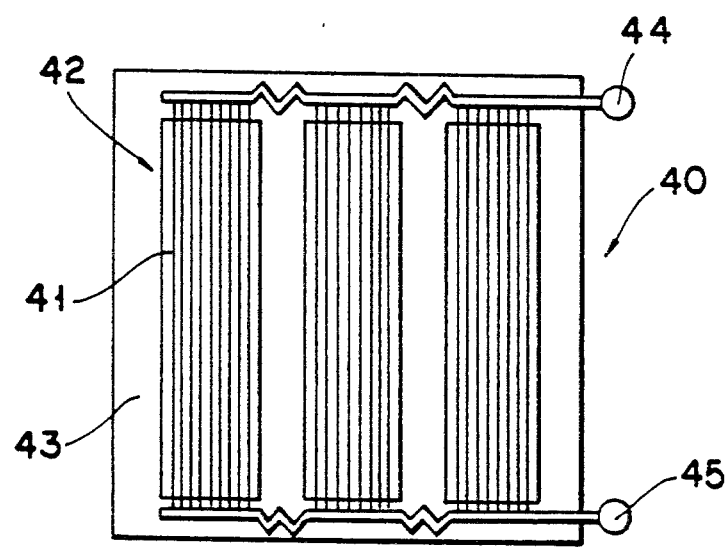
FIG. 5 is a cooler plaque designed for utilization with the fuel cell plaques of the present invention.

Referring to FIG. 5, a cooler plaque 40 has been designed for utilization with the cell fuel plaques. In essence, a bundle of cooling tubes 41, made, for example, of stainless steel tubing and coated with Teflon ® to electrically isolate the tubes from the cells, are disposed in a location corresponding to each individual cell located within the plaque to maximize cooling effectiveness of the cooler plaque. Each tube bundle 41 forms a cooling element 42. Each individual cooling element is sized to have approximately the same surface area as an individual plaque fuel cell, with each element generally comprising a plurality of coolant tubes or grooves located within a supporting plate 43, and having inlet and outlet cooling connections 44 and 45, respectively. Each cooling element is isolated from the other element to maximize cell cooling, by concentrating the cooling on the heat generating cells. One or more cooling plaques may be placed within a stack to control the overall stack temperature, with jumpers around the cooling unit maintaining electrical continuity.

By incorporating a plurality of small fuel cells in an electrically insulating frame and stacking the plaques to form substacks, a fuel cell stack similar to a typical fuel cell stack is produced; however, higher voltages are achieved than could be produced using single cells. For example, replacing a single cell with three small cells in a plaque, provides a threefold increase in voltage per plaque, substantially increasing the overall voltage of the fuel cell stack while minimizing the space requirements for the fuel cell. Since the cell plaque utilizes conventional interconnections for the gas streams, such a cell plaque is adaptable for retrofitting into existing fuel cell stacks for increasing stack voltage output.

While a cell plaque including three cells per plaque is disclosed, it will be understood by those skilled in the art that the number of fuel cells per plaque can be tailored to a particular application and that the invention is not limited by the number of cells used per plaque. Also, while particular embodiments of the present invention have been described, it will be understood that various modifications in the number of plaques per fuel cell and types of feed and inlet configurations could be used without varying from the scope of the present invention.

We claim:

1. A fuel cell stack comprising a plurality of cell plaques, each plaque having a plurality of individual fuel cells electrically isolated from each other, the cells interconnected fluidly to provide a fuel and an oxidizer to each cell, adjacent cells disposed in a plaque-to-plaque relationship forming a substack, each substack serially connected electrically to another substack to increase the stack voltage.

2. The fuel cell stack of claim 1 further comprising a plurality of insulating frames, each plaque having an insulating frame, each plaque cell disposed within recesses in the frame for substantially electrically insulating the cells from each, and having means for supplying a fuel and an oxidizer to the plaque cells.

3. The fuel cell stack of claim 2 wherein the means for supplying a fuel and an oxidizer to the plaque cells comprise ports provided in the frame for fluidically connecting the cells with reactant and oxidizer supply and return manifolds.

4. The fuel cell stack of claim 1 wherein each plaque contains from 2-10 plaque fuel cells.

5. The fuel cell stack of claim 1 wherein each plaque contains 3 plaque fuel cells.

6. The fuel cell stack of claim 1 wherein the fuel cell stack contains from 2 to 10 cell plaques.

7. The fuel cell stack of claim 1 further comprising at least one cooling plaque, each cooling plaque having a plurality of cooling means, each cooling means disposed opposite a respective plaque fuel cell, for cooling said fuel cell, support means provided for supporting the cooling means, the support means having fluid interconnection means for supplying a coolant to the cooling means.

8. A fuel cell plaque comprising a plurality of fuel cells placed in a side-by-side relationship, an insulating frame surrounding the cells, insulating the cells from each other and having means for supplying a reactant and an oxidizer to the cells.

* * * * *